US009067089B2

(12) United States Patent
Hirst

(10) Patent No.: US 9,067,089 B2
(45) Date of Patent: Jun. 30, 2015

(54) SAFETY ANCHOR

(75) Inventor: Robert Hirst, Stourbridge (GB)

(73) Assignee: Capital Safety Group (Northern Europe) Limited (GB)

( * ) Notice: Subject to any disclaimer, the term of this patent is extended or adjusted under 35 U.S.C. 154(b) by 0 days.

(21) Appl. No.: 14/005,967

(22) PCT Filed: Mar. 12, 2012

(86) PCT No.: PCT/EP2012/054284
§ 371 (c)(1),
(2), (4) Date: Sep. 18, 2013

(87) PCT Pub. No.: WO2012/130597
PCT Pub. Date: Oct. 4, 2012

(65) Prior Publication Data
US 2014/0001334 A1 Jan. 2, 2014

(30) Foreign Application Priority Data
Mar. 25, 2011 (GB) .................................. 1104997.0

(51) Int. Cl.
*F16M 13/00* (2006.01)
*A62B 35/00* (2006.01)
*A62B 35/04* (2006.01)
*E04G 21/32* (2006.01)

(52) U.S. Cl.
CPC ......... *A62B 35/0068* (2013.01); *E04G 21/3261* (2013.01); *A62B 35/04* (2013.01)

(58) Field of Classification Search
CPC ............. A62B 35/0068; A01B 12/006; E04G 21/3261; F16B 2/12; F16B 13/0833
See application file for complete search history.

(56) References Cited

U.S. PATENT DOCUMENTS 7,870,888 B2 * 1/2011 Zhou et al. .................. 165/80.3

FOREIGN PATENT DOCUMENTS

| | | |
|---|---|---|
| FR | 2 408 359 | 6/1979 |
| GB | 1 324 667 | 7/1973 |
| GB | 2351789 A | 1/2001 |
| GB | 2466054 A | 6/2010 |
| JP | 200202053 A | 7/2000 |

OTHER PUBLICATIONS

International Search Report issued in PCT/EP2012/054284, mailed Jun. 25, 2012, 4 pages.
Singapore Invitation to Respond to Written Opinion, including the Search Report, from corresponding Singapore Patent Application No. 201306675-8, dated Nov. 12, 2014, 7 pages.

* cited by examiner

*Primary Examiner* — Amy Sterling
(74) *Attorney, Agent, or Firm* — IPLM Group, P.A.

(57) ABSTRACT

A safety anchor includes a coiled spring (5) and a stud (1) extending substantially centrally within the spring. The stud (1) is formed with a portion (3) of reduced strength. Means (7, 9) is provided for securing ends of the spring (5) to the stud (1) at each side of the portion (3) of reduced strength.

16 Claims, 3 Drawing Sheets

SAFETY ANCHOR

This invention relates to a safety anchor which may be deployed on a rooftop or elsewhere, such as an accessible structure of considerable height, so as to provide protection for a user against a fall from height.

Safety anchors are well known for protecting users against falls from height. Once connected to the safety anchor, the user is safe to work around a rooftop or like structure to a distance as far as an attachment lanyard allows. In the event of a fall, the roof anchor deploys to absorb the fall energy of up to a predetermined number of users, for example up to three users. Such safety anchors may be integrated into a system of identical safety anchors joined by a guide cable or guide wire.

There are problems with existing arrangements because the integrity of the safety anchor generally requires to be tested each year. Existing safety anchors are not always resistant to the forces applied during inspection and testing and can become damaged and require replacement.

It is therefore an object of the present invention to provide a safety anchor which overcomes, or at least ameliorates the above-described problems.

According to the present invention there is provided a safety anchor comprising: a coiled spring; a stud extending substantially centrally within the spring, the stud being formed with a portion of reduced strength; and means for securing ends of the spring to the stud at each side of the portion of reduced strength.

The portion of reduced strength may comprise a portion of reduced cross-section of the stud, for example a necked portion, apertured portion or cut-away portion of the stud.

The spring may be in the form of a barrel spring, cylindrical spring or conical spring.

The spring may be permanently secured to the stud or may be removably secured thereto.

The spring may be permanently secured to the stud in the region of each end of the spring by way of an insert which engages with the stud. The inserts may each engage behind a shoulder which is formed on the central stud either side of the portion of reduced strength. The spring inserts may comprise a cup portion having an aperture therethrough so as to form an inwardly extending flange to engage with the shoulder and may also comprise a frustoconical portion which extends within the coils of the spring. An outwardly extending flange may be provided on each insert at that end of the insert remote from the cup. The two inserts may be secured together by a frangible tube which extends around the stud. If desired, the ends of the spring may be provided with caps, for example, cup-shaped caps.

The spring may be removably secured to the stud by way of a clamp in the region of each end of the spring. The clamps are secured to the central stud on either side of the portion of reduced strength. The spring may be formed with a substantially straight portion at each end thereof to allow the clamp to be securely fastened to the ends of the spring. Where the surfaces of the spring and the clamp interact, the spring and/or the clamp may be profiled to increase the security of the fastening between the spring and the clamp. The clamp may be secured to the spring by a securing nut and bolt arrangement. The ends of the spring may be provided with a crimped or kinked section to prevent the spring being pulled out of the clamp.

The spring may be surrounded by a protective housing.

An end of the stud, for example where the stud passes through an end of the housing, may be threaded to provide a securing point for part of a safety system.

The safety anchor may be mounted on a base plate, for example by way of the stud. The safety anchor may be secured to the base plate suitable fastening means which allows the safety anchor to be installed without requiring access to both sides of the base plate.

If required, a spacer may be provided to space the safety anchor above the level of the base plate or structure.

For a better understanding of the present invention and to show more clearly how it may be carried into effect reference will now be made, by way of example, to the accompanying drawings in which.

Figure 1:
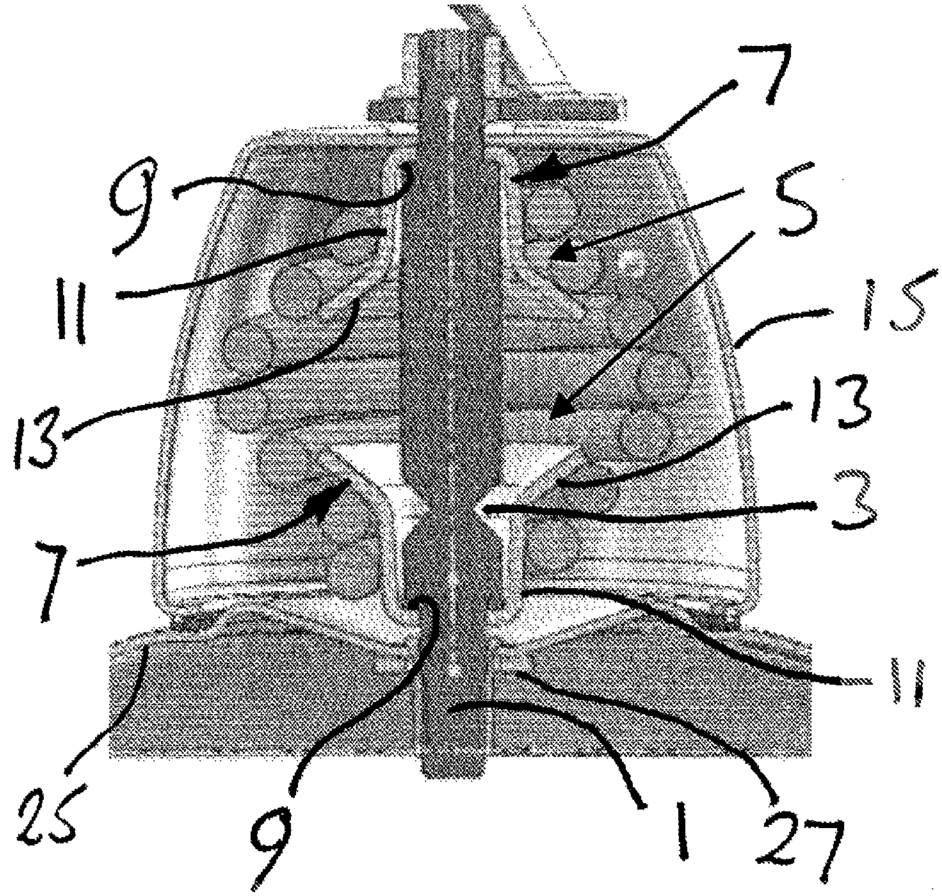
FIG. 1 is a cross-sectional view of one embodiment of a safety anchor according to the present invention.
Figure 2:
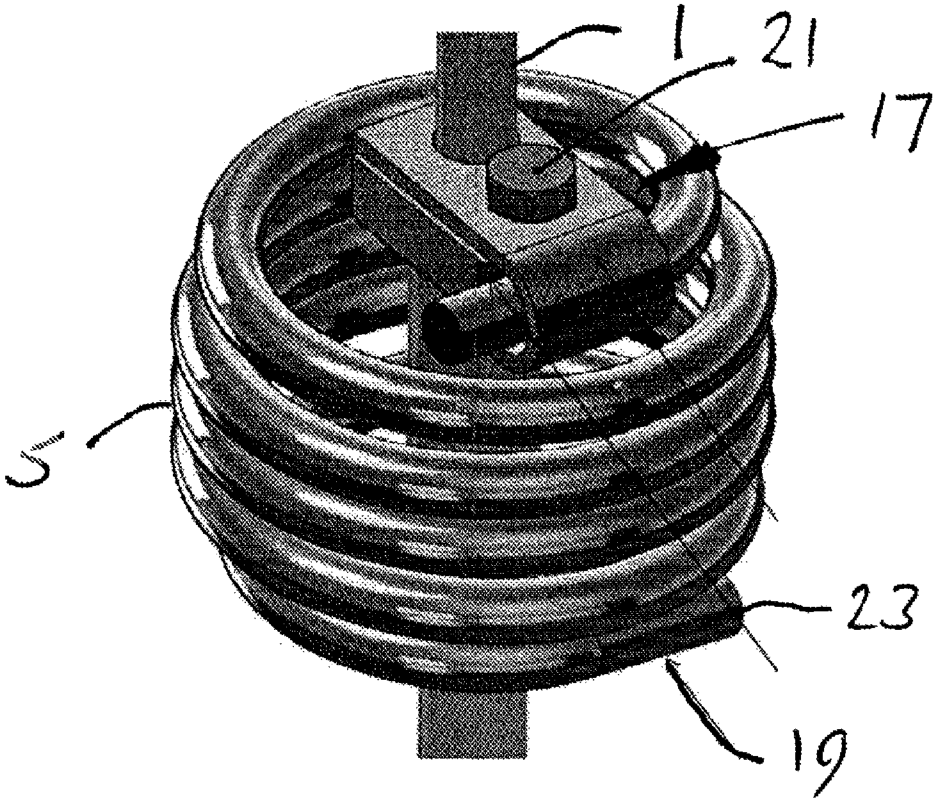
FIG. 2 is a perspective view of part of a safety anchor similar to that shown in FIG. 1.

The safety anchor shown in FIGS. 1 and 2 comprises a central stud 1 which serves to secure the safety anchor to a baseplate 25 or other structure, for example by way of a mechanical fixing or by means of a curable resin, although a threaded mechanical connection is generally preferred. The central stud is formed with a necked portion 3 of reduced strength, the necked portion causing the stud to break when a predetermined load is applied. Other configurations in which the stud is formed with a portion of reduced cross-section are possible, such as an aperture or a cut-away portion. The necked portion is designed to remain intact when a load of up to 300 kg or 3 kN is applied in any direction so as to absorb forces conventionally applied by a safety system and to absorb additional light loads without breaking, but to break in the event of a fall.

A coil spring 5 is arranged around the stud 1 and one end of the spring is secured to the stud at each side of the necked portion 3, for example in a manner as will be described hereinafter. The coil spring 5 is shown in the form of a barrel spring (having a greater diameter in a mid region thereof than in the two end regions), but other spring configurations, such as cylindrical or conical, can be used. The purpose of the spring is to extend and to absorb the energy of a falling user when the central stud 1 breaks.

As will be explained hereinafter in more detail, each end of the spring incorporates securing means for securing one end of the spring to the central stud 1 either side of the necked portion 3. The securing means may or may not be permanently secured to the spring. When stud 1 breaks on experiencing the load of a falling user, the securing means remains connected between the spring and the stud and maintains the safety anchor and the user attached to the structure.

The spring shown in FIG. 1 is formed at each end around an insert 7 which is permanently fixed into the spring once the spring has been formed around the insert. The inserts 7 each engage behind a shoulder 9 which is formed on the central stud 1 either side of the necked portion 3. Thus, the spring inserts 7 comprise a cup portion 11 having an aperture therethrough so as to form an inwardly extending flange to engage with the shoulder 9 and a frustoconical portion 13 which extends within the coils of the spring to prevent the spring disengaging from the insert. If desired, to enhance security, an outwardly extending flange may be provided on each insert at that end of the insert remote from the cup and/or, for convenience, the two inserts may be secured together by a frangible tube which extends around the central stud 1. If desired, the ends of the spring may be provided with cup-shaped caps (not shown) which assist in ensuring the coils of the spring remain together. This improves the ability to resist higher loads under static forces and restricts unravelling of the spring.

The spring 5 is surrounded by a protective housing 15 which prevents the spring assembly 1, 5 being exposed to the elements. It is only in the event of a fall, when the energy absorbing module is deployed, that the spring is exposed. The housing 15 additionally supports the spring assembly 1, 5 against light (non-fall) lateral forces and maintains the spring assembly and housing in an upright configuration. That is, trip loads and cable tension of the safety system, of which the safety anchor forms a part, will not cause the spring assembly 1, 5 and housing 15 to lean.

As can be seen from FIG. 1, an end of the central stud 1 passes through an end of the housing 15 and is threaded to provide a securing point for part of the safety system.

As an alternative to the insert 7, a fastener may extend from the central stud 1, around one or more coils of the spring, and back between adjacent coils to the central stud.

The spring 5 shown in FIG. 2 is provided with a clamp 17 in the region of each end of the spring, the clamps being secured to the central stud, one either side of the necked portion 3. In this case, the spring 5 is formed with a substantially straight portion 19 at each end thereof to allow the clamp 17 to be securely fastened to the ends of the spring. Where the surfaces of the spring and the clamp interact, the spring and/or the clamp may be profiled to increase the security of the fastening between the two components. Alternatively, a profiled member, for example in the form of a wedge, may be provided between the clamp and the spring to achieve the same effect. The clamp 17 is secured to the spring 5 by a securing nut and bolt arrangement 21 to pinch the assembly together to force the wedge to create a clamping force. In either case, the ends 23 of the spring are provided with a crimped or kinked section to act as a final dead stop against the forces arising from a fall. The crimped or kinked section prevents the spring being pulled out of the clamp.

Where the safety anchor is secured to a base plate or structure by a mechanical fastening, the safety anchor can be removed and replaced, generally with there being no need to gain access beneath the base plate or within the structure, thereby simplifying initial installation and maintenance. If a user should fall and cause the safety anchor to deploy then the safety anchor needs to be replaced. Generally, this will simply require the deployed safety anchor to be unscrewed and a replacement safety anchor to be screwed into the base plate or structure and tightened to a predetermined torque, but alternatively the base plate can also be replaced.

The safety anchor is generally subject to an annual test which involves pulling on the safety anchor in an upward direction in order to test the integrity of the fasteners that secure the anchor to the structure or base plate and/or the fasteners that secure the base plate to the structure. The stud 1 is configured not to break during such a test. Moreover, the upward test force will not break any waterproof seal between the base plate and the housing 15.

The combination of the spring and the central stud provides a safety anchor which has high resistance to both dynamic and static loads, with the security that the spring is securely attached to the stud either side of the necked portion.

Figure 3:
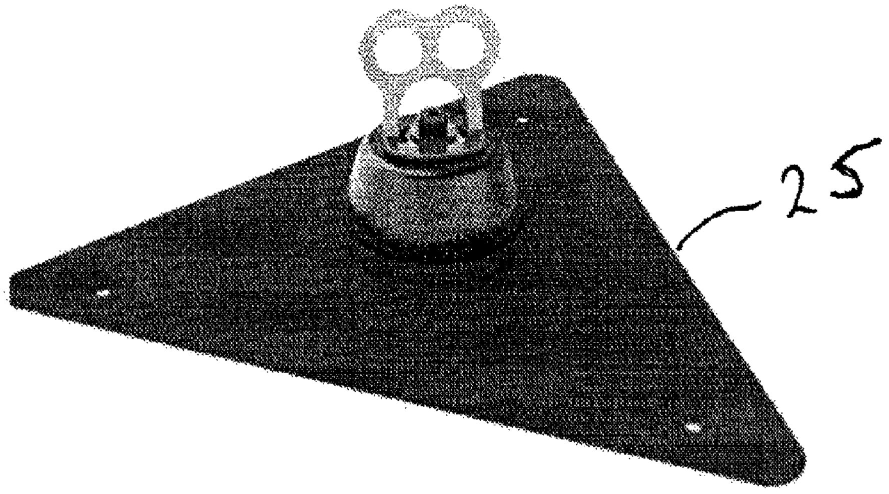
FIG. 3 shows the safety anchor of FIG. 1 mounted on a base plate.

FIG. 3 shows the safety anchor of FIG. 1 mounted on a base plate 25 which acts as an interface between the safety anchor and a structure. The base plate is configured to withstand the forces generated by a fall and is provided with apertures to allow the base plate to be secured to the structure by means of suitable fasteners (not shown). Alternatively, the base plate can be secured by means of a curable resin. The safety anchor may be secured to the base plate 25 by means of a suitable fastening means 27 (see FIG. 1), such as a captive nut, welded nut, rivet nut, spin riveted nut or press deformation. This allows the safety anchor to be installed without requiring access to both sides of the base plate 25. Attachment of the safety anchor to the base plate 25 creates a self-sealing waterproof joint between the base plate and the housing 15. This reduces the need to construct flashing membranes on site to prevent water ingress through the base plate.

The base plate can be of any convenient configuration, for example triangular, and of any suitable size and material. The base plate serves to withstand loads and to act as a fixing means for the safety anchor.

A shroud (not shown) can be positioned between the base plate 25 and the housing 15 so as to form a waterproof seal between the base plate and the housing. The shroud may have an upstanding collar within the housing and a skirt which extends beyond the housing and rests upon the base plate. A roof membrane can extend over a peripheral region of the base plate by means of an aperture formed in the membrane, and the edge of the aperture can be secured to the edge of the skirt of the shroud in a waterproof manner.

Alternatively, the safety anchor can be secured directly to the structure, without the need for a base plate, which can reduce installation time.

If required, the safety anchor may be spaced above the level of the base plate or structure, which may be necessary or desirable, for example, if the height of the structure or the base plate should change, such as due to refurbishment. In this case a spacer (not shown) may be provided between the safety anchor and the base plate or structure.

The invention claimed is:

1. A safety anchor comprising: a coiled spring; a stud extending substantially centrally within the spring, the stud being formed with a portion of reduced strength configured and arranged to break when subjected to a predetermined load of a falling user; and ends of the spring secured to the stud at each side of the portion of reduced strength.

2. A safety anchor as claimed in claim 1, wherein the portion of reduced strength comprises a portion of reduced cross-section of the stud, the portion of reduced cross-section comprising for example a necked portion, apertured portion or cut-away portion of the stud.

3. A safety anchor as claimed in claim 1, wherein the spring is permanently secured to the stud.

4. A safety anchor as claimed in claim 3, wherein the spring is permanently secured to the stud in the region of each end of the spring by way of an insert which engages with the stud, the inserts for example each engaging behind a shoulder which is formed on the central stud either side of the portion of reduced strength.

5. A safety anchor as claimed in claim 4, wherein the inserts comprise a cup portion having an aperture therethrough so as to form an inwardly extending flange to engage with the shoulder, the inserts also optionally comprising a frustoconical portion which extends within the coils of the spring, an outwardly extending flange optionally being provided on each insert at that end of the insert remote from the cup portion.

6. A safety anchor as claimed in claim 4, wherein the two inserts are secured together by a frangible tube which extends around the stud.

7. A safety anchor as claimed in claim 4, wherein the ends of the spring are provided with caps.

8. A safety anchor as claimed in claim 1, wherein the spring is removably secured to the stud, for example by way of a clamp in the region of each end of the spring, the clamps optionally being secured to the central stud on either side of the portion of reduced strength.

9. A safety anchor as claimed in claim 8, wherein the spring is formed with a substantially straight portion at each end thereof to allow the clamp to be securely fastened to the ends of the spring.

10. A safety anchor as claimed in claim 8, wherein the surfaces of the spring and the clamp interact, the spring and/or the clamp is profiled to increase the security of the fastening between the spring and the clamp.

11. A safety anchor as claimed in claim 8, wherein the clamp is secured to the spring by a securing nut and bolt arrangement.

12. A safety anchor as claimed in claim 8, wherein the ends of the spring are provided with a crimped or kinked section to prevent the spring being pulled out of the clamp.

13. A safety anchor as claimed in claim 1, wherein an end of the stud is threaded to provide a securing point for part of a safety system.

14. A safety anchor as claimed in claim 13, wherein the spring is surrounded by a protective housing and the stud is threaded where the stud passes through an end of the housing.

15. A safety anchor as claimed in claim 1, wherein the safety anchor is mounted on a base plate, for example by way of the stud, the safety anchor optionally being secured to the base plate by fastening means which allows the safety anchor to be installed and/or removed without requiring access to both sides of the base plate, the safety anchor further optionally including a spacer to space the safety anchor above the level of the base plate.

16. A safety anchor comprising: a coiled spring; a stud extending substantially centrally within the spring, the stud being formed with a portion of reduced strength configured and arranged to break when subjected to a predetermined load of a falling user; and means for securing ends of the spring secured to the stud at each side of the portion of reduced strength.

* * * * *